(12) United States Patent
Wu et al.

(10) Patent No.: US 9,058,540 B2
(45) Date of Patent: Jun. 16, 2015

(54) DATA CLUSTERING METHOD AND DEVICE, DATA PROCESSING APPARATUS AND IMAGE PROCESSING APPARATUS

(75) Inventors: Yi-Ta Wu, Taipei County (TW); Hung-I Pai, Taipei County (TW); Kung-Ming Lan, Yilan County (TW)

(73) Assignee: Industrial Technology Research Institute, Hsinchu (TW)

(*) Notice: Subject to any disclaimer, the term of this patent is extended or adjusted under 35 U.S.C. 154(b) by 597 days.

(21) Appl. No.: 13/012,802

(22) Filed: Jan. 25, 2011

(65) Prior Publication Data

US 2012/0133789 A1  May 31, 2012

(30) Foreign Application Priority Data

Nov. 29, 2010  (TW) .............................. 99141260 A

(51) Int. Cl.
*H04N 5/225* (2006.01)
*G06K 9/46* (2006.01)
*G06K 9/62* (2006.01)

(52) U.S. Cl.
CPC ............ *G06K 9/4652* (2013.01); *G06K 9/6223* (2013.01); *G06K 9/6276* (2013.01)

(58) Field of Classification Search
CPC .... H04N 9/045; G06K 9/6223; G06K 9/6218
USPC .......... 348/272, 277, 280, 254, 256; 382/155, 382/170, 255
See application file for complete search history.

(56) References Cited

U.S. PATENT DOCUMENTS

| | | | |
|---|---|---|---|
| 7,397,945 B2 | 7/2008 | Zhang | |
| 7,460,717 B2 | 12/2008 | Jafarkhani et al. | |
| 2003/0044061 A1* | 3/2003 | Prempraneerach et al. | .. 382/164 |
| 2007/0244844 A1 | 10/2007 | Brinson et al. | |
| 2010/0017353 A1 | 1/2010 | Brinson, Jr. et al. | |
| 2010/0121851 A1 | 5/2010 | Kumaran | |

FOREIGN PATENT DOCUMENTS

| | | |
|---|---|---|
| CN | 1869971 | 11/2006 |
| CN | 1996343 | 7/2007 |
| TW | 200741533 | 11/2007 |
| TW | 200817954 | 4/2008 |

(Continued)

OTHER PUBLICATIONS

"Office Action of Taiwan Counterpart Application", issued on Oct. 3, 2013, p. 1-p. 13.

(Continued)

*Primary Examiner* — Twyler Haskins
*Assistant Examiner* — Carramah J Quiett
(74) *Attorney, Agent, or Firm* — Jianq Chyun IP Office

(57) ABSTRACT

A data clustering method, a data clustering device using the same, and an image processing apparatus and a data processing apparatus equipped with the data clustering device are provided. The method includes sorting a plurality of data point to be clustered and generating a processing sequence based on the sorting, wherein each of the data point has at least one feature value. The method also includes using a non-iterative mechanism to cluster the data points into a plurality of data clusters according to the processing sequence. The method further includes optimizing the generated data clusters. Accordingly, the data clustering method can fast cluster the data points.

22 Claims, 13 Drawing Sheets

(56) References Cited

FOREIGN PATENT DOCUMENTS

| TW | I312128 | 7/2009 |
| TW | 201017439 | 5/2010 |
| TW | 201020970 | 6/2010 |

OTHER PUBLICATIONS

"Office Action of China Counterpart Application", issued on Jul. 1, 2014, p. 1-p. 10.
"Office Action of Taiwan Counterpart Application", issued on May 12, 2014, p. 1-p. 10.

* cited by examiner

| Currently processed data point | | Feature value difference compared with the current data group | | Clustering | First data group | | Second data group | |
|---|---|---|---|---|---|---|---|---|
| Data point | Feature value | First data group | Second data group | | Feature value | Data points within data group | Feature value | Data points within data group |
| A | 3 | – | – | Adding new data group | 3 | A | – | – |
| B | 7 | 4 | – | Adding new data group | 3 | A | 7 | B |
| C | 2 | 1 | 5 | Updating data group | 2.5 | A,C | 7 | B |
| D | 6 | 3.5 | 1 | Updating data group | 2.5 | A,C | 6.5 | B,D |
| E | 4 | 1.5 | 2.5 | Updating data group | 3 | A,C,E | 6.5 | B,D |
| F | 8 | 5 | 1.5 | Updating data group | 3 | A,C,E | 7 | B,D,F |

FIG. 4

DATA CLUSTERING METHOD AND DEVICE, DATA PROCESSING APPARATUS AND IMAGE PROCESSING APPARATUS

CROSS-REFERENCE TO RELATED APPLICATION

This application claims the priority benefit of Taiwan application serial no. 99141260, filed on Nov. 29, 2010. The entirety of the above-mentioned patent application is hereby incorporated by reference herein and made a part of this specification.

BACKGROUND

1. Field of the Disclosure

The disclosure relates to a data clustering method for clustering similar data points into the same data cluster, a data clustering device, a data processing apparatus and an image processing apparatus using the same.

2. Description of Related Art

Data clustering is a multivariate data analysis technique in mathematical statistics, which is an unsupervised data analysis method. A main purpose of the data clustering is to group original data into clusters and find a representative point of each cluster, so as to reduce a data amount and reduce complexity of data analysis. The data clustering method is to cluster the data having a similar feature into the same cluster according to a feature distribution of the data, so as to cluster the whole data into a plurality of clusters, and then the data of different clusters can be further analysed. The data clustering is widely used in various domains such as data mining, pattern recognition, market segmentation, cell formation problem and bioinformatics popular in recent years.

The current data clustering techniques can be divided into two types of a partitional clustering technique and a hierarchical clustering technique.

A basic principle of the partitional clustering technique is to reduce a distance square error of each data point and a cluster center in the cluster. Regarding a partitional clustering method, in case that n objects (or data) are provided and the number (for example, K) of clusters to be partitioned is predetermined, an initial partition result is first generated according to the K value, and then an iterative relocation technique is used to move the objects from an original cluster to the other clusters, so as to improve the partition result. Generally, according to a good partition result, the objects within the same cluster are closed or similar to each other, and the objects of different clusters are remote or different to each other. A most famous partitional clustering technique is a K-means clustering technique provided in 1967. According to the K-means clustering technique, k cluster centers are randomly selected first, and then cluster gravity centers or the cluster centers are used to respectively group all of the data objects to the clusters most similar to the cluster centers, and after all of the data are grouped, the cluster centers are recalculated, and the above steps are repeated until a value of the cluster center of each cluster is not changed.

The hierarchical clustering technique is generally presented through a tree structure, and the data clustering can be achieved by dividing or agglomerate the data layer-by-layer, the hierarchical clustering technique can be further divided into a hierarchical agglomerative clustering technique and a hierarchical divisive clustering technique according to different generation methods of the tree structure.

Regarding the hierarchical agglomerative clustering technique, the clustering is implemented through a bottom-up manner. According to the hierarchical agglomerative clustering technique, each batch of data is regarded as a cluster at an initial stage. In other words, if there are n pieces of data, there will be n clusters at the initial stage. Then, the clusters are agglomerated from the bottom of the tree structure. During each agglomeration, two closest clusters are agglomerated into a new cluster until the number of the clusters is complied with a predetermined value. Therefore, the number of the clusters is reduced by one during each agglomeration until the final cluster is generated. Assuming m agglomerations are performed, the number of the clusters is then changed from n to (n-m).

Regarding the hierarchical divisive clustering technique, the clustering is implemented through a top-down manner. According to the hierarchical divisive clustering technique, all of the data is regarded as one cluster at the initial stage, and a new cluster is generated during each division until the number of the clusters is complied with a predetermined value. In other words, if there are n pieces of data, there will be only one cluster at the initial stage, and after m divisions, the number of the clusters is changed from 1 to m+1.

Therefore, all of the current data clustering techniques require the iterative operation to group the data into the suitable data clusters. However, in an embedded system, a memory space is limited, so that there is no enough memory space for storing feature values of the data points required to be recorded when the aforementioned data clustering technique is executed. For example, assuming the number of the data points for clustering is 16001, and each data point requires an integer number of 4 bytes to store the feature value. Therefore, when the aforementioned data clustering technique is used for data clustering, 64004 bytes memory storage space is required. However, in general, a size of the memory space of the current embedded system is only 64K. Therefore, during each iterative operation, additional content switching is required to switch the original data in the memory into unprocessed data, and then the clustering operation can be completed. Such content switching may have increasing data transmission cost as the number of the data points is increased, so that performance of the embedded system is influenced.

SUMMARY OF THE DISCLOSURE

The disclosure is related to a data clustering method and a data clustering device using the same, and a data processing apparatus and an image processing apparatus equipped with the data clustering device, which can quickly cluster all of data points of data.

The disclosure provides a data clustering method for clustering a plurality of data points, wherein each of the data points has at least one feature value. The method includes sorting the data points and generating a processing sequence based on a sorting result. The method also includes using a non-iterative mechanism to cluster the data points into a plurality of data clusters according to the processing sequence by performing data accessing to each of the data points only once. The method further includes optimizing the generated data clusters.

The disclosure provides a data clustering method for using a non-iterative mechanism to cluster a plurality of data points into a plurality of data clusters, wherein each of the data points has at least one feature value. The method includes: selecting a target data point from the data points; determining whether any data group has been generated, where when no data group is generated, a step (a) is executed, and when one or a plurality of data groups has been generated, a step (b) is executed; (a) adding a new data group and grouping the selected target data point into the new data group; (b) calculating feature value differences between feature values corresponding to the current data groups and the feature value of the selected target data point, identifying a minimum feature value difference among the feature value differences, and determining whether the minimum feature value difference is smaller than a difference threshold of a data group corresponding to the minimum feature value difference, where when the minimum feature value difference is not smaller than the difference threshold of the data group corresponding to the minimum feature value difference, the step (a) is executed, and when the minimum feature value difference is smaller than the difference threshold of the data group corresponding to the minimum feature value difference, the selected target data point is grouped into the data group corresponding to the minimum feature value difference; updating a feature value of a data group added with the target data point, where the feature value of the data group added with the target data point is obtained by averaging the feature values of the data points belonged to the data group added with the target data point; and determining whether all of the data points have been grouped, where when all of the data points have been grouped, the generated data groups are served as the data clusters, and when any data point in the data points is not grouped, re-selecting a target data point from the data points.

The disclosure provides a data processing apparatus for clustering a plurality of data points, wherein each of the data points has at least one feature value. The data processing apparatus includes a data pre-processing module, a data clustering device and a data post-processing module. The data pre-processing module is configured for sorting the data points and generating a processing sequence based on a sorting result. The data clustering module is configured for using a non-iterative mechanism to cluster the data points into a plurality of data clusters according to the processing sequence by performing data accessing to each of the data points only once. The data post-processing module is configured for optimizing the generated data clusters.

The disclosure provides a data clustering device for using a non-iterative mechanism to cluster a plurality of data points into a plurality of data clusters by performing data accessing to each of the data points only once, wherein each of the data points has at least one feature value. The data clustering device includes a data input and data cluster output sub module, a data group generation sub module and a feature updating module coupled to the data input and data cluster output sub module. The data input and data cluster output sub module is configured for sequentially selecting a target data point from the data points, and the data group generation sub module is configured for determining whether any data group has been generated. When no data group is generated, the data group generation sub module is further configured for adding a new data group and grouping the target data point selected by the data input and data cluster output sub module into the new data group. When one or a plurality of data groups has been generated, the data group generation sub module is further configured for calculating feature value differences between feature values corresponding to the current data groups and the feature value of the selected target data point, identifying a minimum feature value difference among the feature value differences, and determining whether the minimum feature value difference is smaller than a difference threshold of a data group corresponding to the minimum feature value difference, where when the minimum feature value difference is not smaller than the difference threshold of the data group corresponding to the minimum feature value difference, the data group generation sub module is further configured for adding a new data group and grouping the selected target data point into the new data group. When the minimum feature value difference is smaller than the difference threshold of the data group corresponding to the minimum feature value difference, the data group generation sub module is further configured for grouping the selected target data point into the data group corresponding to the minimum feature value difference. Moreover, the feature updating module is configured for updating the feature value of a data group added with the target data point, where the feature value of the data group added with the target data point is obtained by averaging the feature values of the data points belonged to the data group added with the target data point. In addition, the data input and data cluster output sub module is further configured for determining whether all of the data points have been grouped. When all of the data points have been grouped, the data input and data cluster output sub module is further configured for taking the generated data groups as the data clusters of the data points to be clustered. When any data point in the data points is not grouped, the data input and data cluster output sub module is further used for sequentially selecting another target data point from the data points.

The disclosure provides an image processing apparatus including an image sensing device, a data pre-processing module, a data clustering device and a data post-processing module. The image sensing device is configured for capturing an image, where the image has a plurality of data points and each of the data points has at least one feature value. The data pre-processing module is configured for sorting the data points and generating a processing sequence based on a sorting result. The data clustering module is configured for using a non-iterative mechanism to cluster the data points into a plurality of data clusters according to the processing sequence by performing data accessing to each of the data points only once. The data post-processing module is configured for optimizing the generated data clusters.

According to the above descriptions, the data clustering method and the data clustering device using the same, and the data processing apparatus and the image processing apparatus equipped with the data clustering device can quickly cluster data without applying an iterative operation.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 is a clustering table illustrated according to FIGS. 3A-3G.

DETAILED DESCRIPTION OF DISCLOSED EMBODIMENTS

Figure 1:
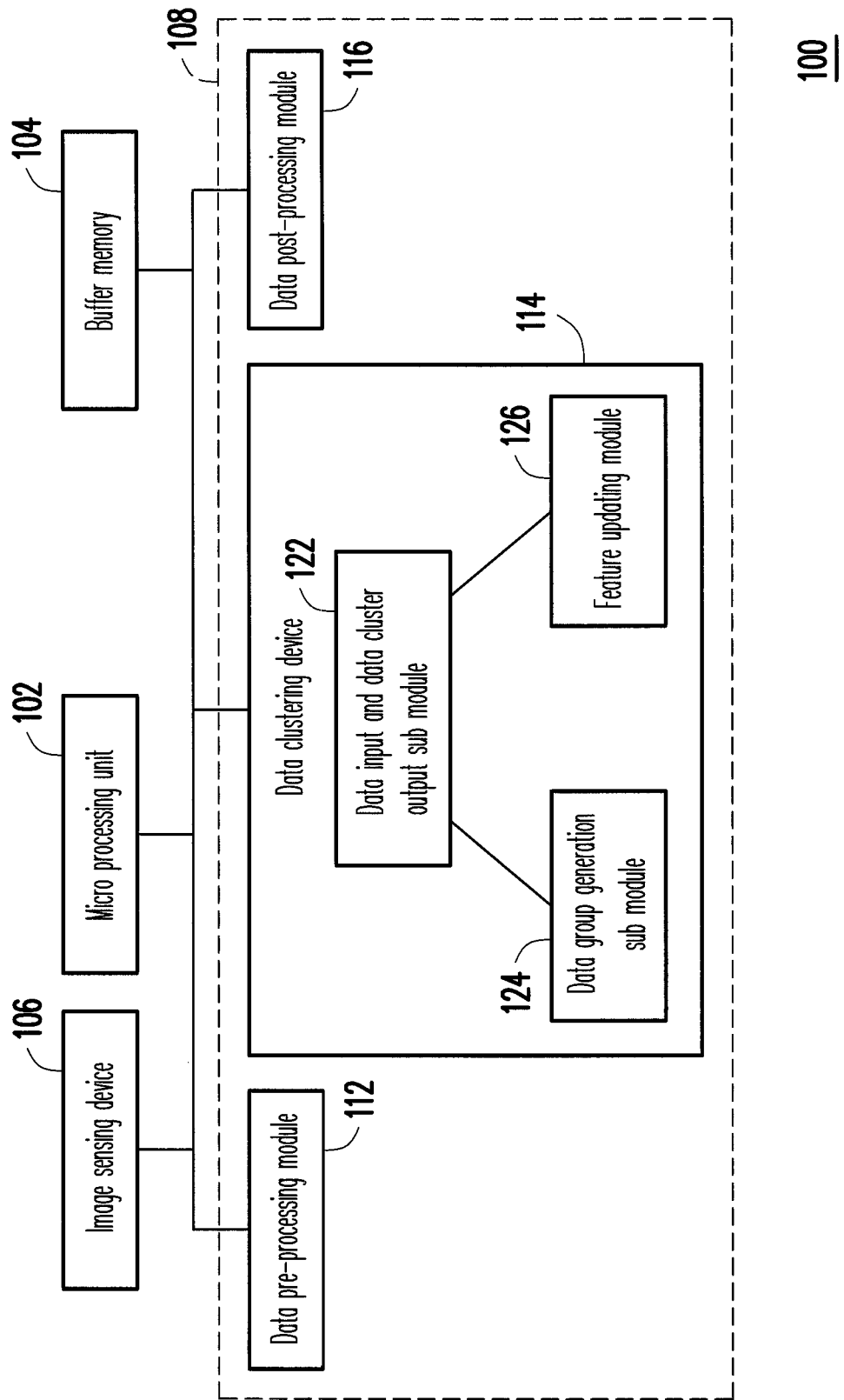
FIG. 1 is a block diagram illustrating an image processing apparatus according to a first exemplary embodiment of the disclosure.

According to a data clustering method disclosed by the disclosure, a non-iterative mechanism is used to directly determine data clusters that data points are belonged to according to feature values of the data points and feature values of the data clusters, so as to quickly cluster the data points into a plurality of the data clusters. In this way, resource cost for data transmission can be effectively reduced according to the data clustering method of the disclosure. A plurality of exemplary embodiments is provided below for describing the disclosure and reference will now be made in detail to the exemplary embodiments of the disclosure, examples of which are illustrated in the accompanying drawings. Wherever possible, the same reference numbers are used in the drawings and the description to refer to the same or like parts.

First Exemplary Embodiment

FIG. 1 is a block diagram illustrating an image processing apparatus according to a first exemplary embodiment of the disclosure.

Referring to FIG. 1, the image processing apparatus 100 includes a micro processing unit 102, a buffer memory 104, an image sensing device 106 and a data processing device 108.

The micro processing unit 102 is configured for controlling a whole operation of the image processing apparatus 100. For example, the micro processing unit 102 may give instructions to the data processing device 108 for clustering data.

The buffer memory 104 is coupled to the micro processing unit 102, and is configured for temporarily storing data. In the present exemplary embodiment, the buffer memory 104 is a static random-access memory (SRAM), though the disclosure is not limited thereto, and in another exemplary embodiment, the buffer memory 104 can also be a dynamic random access memory or other memories.

The image sensing device 106 is coupled to the micro processing unit 102. The image sensing device 106 is configured for sensing an image under control of the micro processing unit 102, and outputting corresponding image data. For example, the micro processing unit 102 may store the image data output by the image sensing device 106 into the buffer memory 104.

In the present exemplary embodiment, the data processing device 108 is coupled to the micro processing unit 102, and includes a data pre-processing module 112, a data clustering device 114 and a data post-processing module 116.

The data pre-processing module 112 is configured for sorting data points to be clustered and generating a processing sequence based on a sorting result. In detail, the micro processing unit 102 may store the data to be clustered (for example, the image data captured by the image sensing device 106) into the buffer memory 104, and when the data processing device 108 receives an instruction from the micro processing unit 102 to cluster the data, the data pre-processing module 112 sorts data points of the data according to feature values of the data points.

For example, taking the image data as an example, the feature value of each data point includes color intensity values of the three primary color (i.e. red, green and blue) levels, and the data pre-processing module 112 may construct a corresponding histogram according to the color intensity values of each data point of the image data, and sorts all of the data points according to the constructed histogram.

Figure 2:
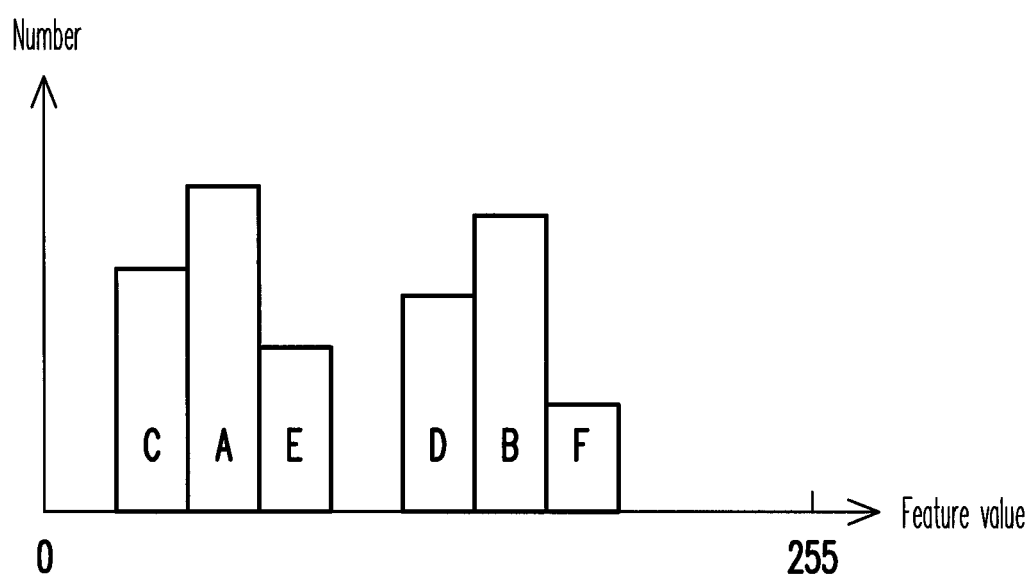
FIG. 2 is an example of a histogram corresponding data according to the first exemplary embodiment of the disclosure.

FIG. 2 is an example of a histogram corresponding data according to the first exemplary embodiment of the disclosure. For simplicity's sake, only one-dimensional histogram is illustrated according to a single-dimensional feature value (for example, the red color level). However, it should be understand that the disclosure is not limited thereto, and the corresponding histogram can be constructed according to multi-dimensional feature values of the data points.

Referring to FIG. 2, the data pre-processing module 112 equally divides the red color level with a range of 0-255 into 12 sub color levels, and calculates the number of the data points belonged to each sub color level according to the feature values of all of the data points. As shown in FIG. 2, the feature values of all of the data points are respectively belonged to sub color levels A-F, and the number of the data points of the sub color level A is greater than the number of the data points of the sub color level B, the number of the data points of the sub color level B is greater than the number of the data points of the sub color level C, the number of the data points of the sub color level C is greater than the number of the data points of the sub color level D, the number of the data points of the sub color level D is greater than a number of the data points of the sub color level E, and the number of the data points of the sub color level E is greater than the number of the data points of the sub color level F.

After the corresponding histogram is constructed, the data pre-processing module 112 sorts the data points according to the number of the data points of each sub color level, and generates the processing sequence according to the sorting result. As shown in the example of FIG. 2, the data points of the image data are sorted according to the sequence of the sub color levels A, B, C, D, E and F.

However, it should be understand that the disclosure is not limited to the above example, and in another exemplary embodiment of the disclosure, the data pre-processing module 112 can directly sort the data points according the feature values of all of the data points. For example, the data pre-processing module 112 can sort all of the data points in an ascending sequence or descending sequence according to the feature value of each of the data points.

Referring to FIG. 1, the data clustering module 114 uses a non-iterative mechanism to cluster all of the data points of the data to be clustered into a plurality of data clusters according to the processing sequence generated by the data pre-processing module 112. In detail, the data clustering device 114 selects one of the data points according to the processing sequence generated by the data pre-processing module 112, and identifies the data cluster where the data point is belonged to or establishes a new data cluster for the data point according to the feature value of the selected data point, so as to directly cluster the data point without using an iterative method to iteratively confirm the data cluster for each of the data points.

The data clustering device 114 includes a data input and data cluster output sub module, a data group generation sub module 124 and a feature updating module 126.

The data input and data cluster output sub module 122 is configured for sequentially receiving the data points to be clustered according to the processing sequence generated by the data pre-processing module 112.

The data group generation sub module 124 is configured for identifying similarities of the data points, so as to gradually group the similar data points into the same data group. For example, the data group generation sub module 124 calculates a feature value difference between the feature value of the data point and a feature value of the data group, and identifies that the data point is belonged to such data group when the feature value difference is smaller than a difference threshold, so as to group the similar data points into the same data group. In the first exemplary embodiment, the difference threshold is a fixed value, which can be set by the user according to the feature of the data to be clustered.

The feature updating module 126 is configured for updating the feature values of the generated data groups. For example, the feature updating module 126 averages the feature values of all of the data points belonged to a data group to serve as the feature value of the data group.

Particularly, the data group generation sub module 124 may sequentially group each of the data points to a suitable data group, and after all of the data points are grouped, the data input and data cluster output sub module 122 outputs the generated data groups to serve as the data clusters corresponding to the data.

In order to clearly describe the operations of the data input and data cluster output sub module 122, the data group generation sub module 124 and the feature updating module 126, an example is provided below for description.

FIGS. 3A-3G are schematic diagrams illustrating clustering operations according to the first exemplary embodiment of the disclosure, and FIG. 4 is a clustering table illustrated according to FIGS. 3A-3G.

Figure 3A:
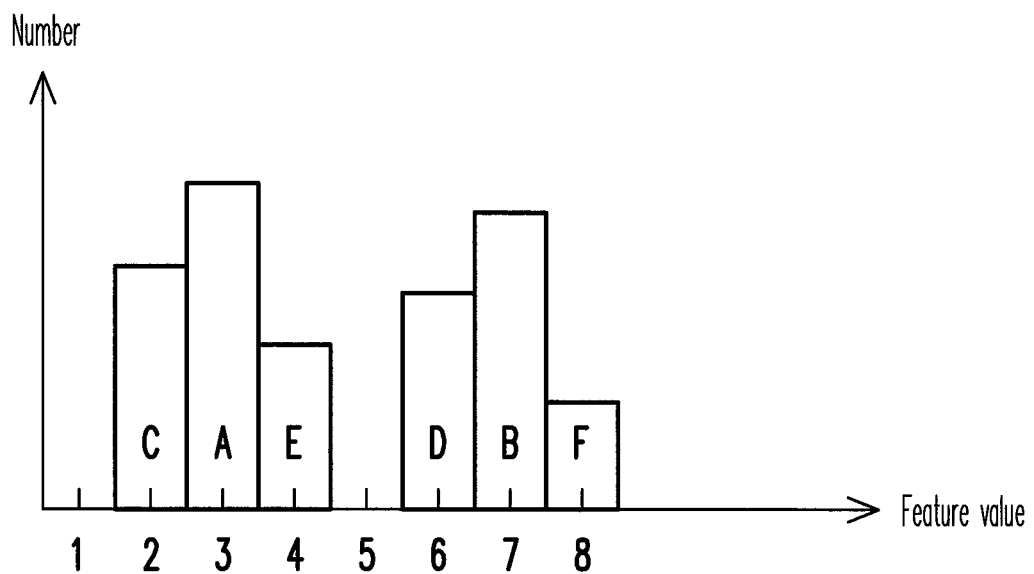
FIGS. 3A-3G are schematic diagrams illustrating clustering operations according to the first exemplary embodiment of the disclosure.

Referring to FIG. 3A, assuming the data points corresponding to the image data are respectively belonged to the sub color levels A-F according to the feature values thereof, wherein the feature values of the data points belonging to the sub color level C are all 2, the feature values of the data points belonging to the sub color level A are all 3, the feature values of the data points belonging to the sub color level E are all 4, the feature values of the data points belonging to the sub color level D are all 6, the feature values of the data points belonging to the sub color level B are all 7, and the feature values of the data points belonging to the sub color level F are all 8. Moreover, it is assumed that the difference threshold is 2. In the present example, the data pre-processing module 112 may sequentially transmit the data points of the sub color level A, the data points of the sub color level B, the data points of the sub color level C, the data points of the sub color level D, the data points of the sub color level E, and the data points of the sub color level F to the data clustering device 114 according to the numbers of the data points of the sub color levels.

Figure 3B:
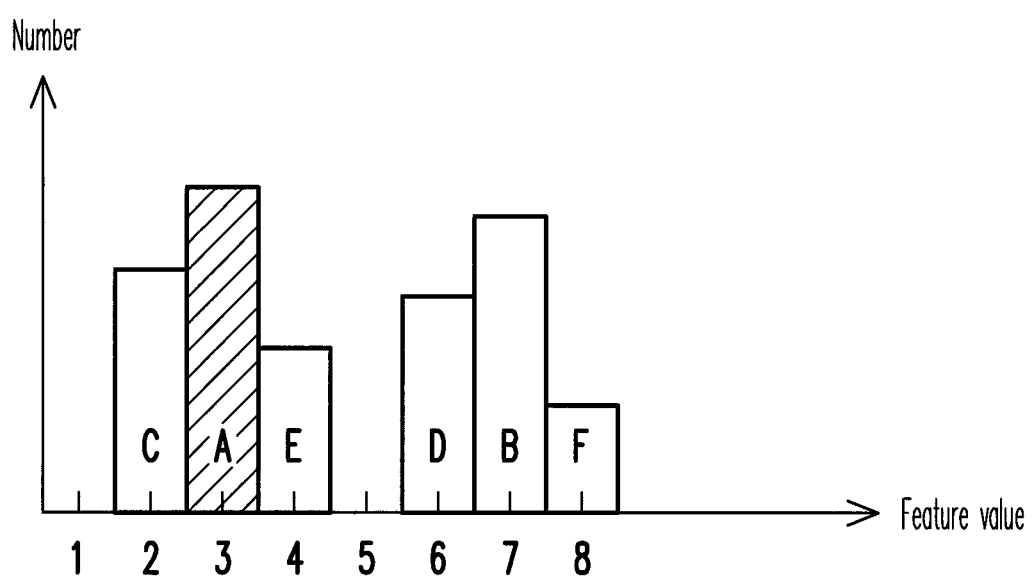

Referring to FIG. 3B, when the data input and data cluster output sub module 122 receives the data points of the sub color level A, the data group generation sub module 124 identifies that no data group has been generated. Therefore, the data group generation sub module 124 generates a first data group, and groups the data points of the sub color level A into the first data group. Moreover, the feature updating module 126 calculates a feature value of the first data group. As described above, the feature value of the first data group is an average of the feature values of all of the data points in the first data group. Therefore, the feature updating module 126 sets the feature value of the first data group as 3 (shown in FIG. 4).

Figure 3C:
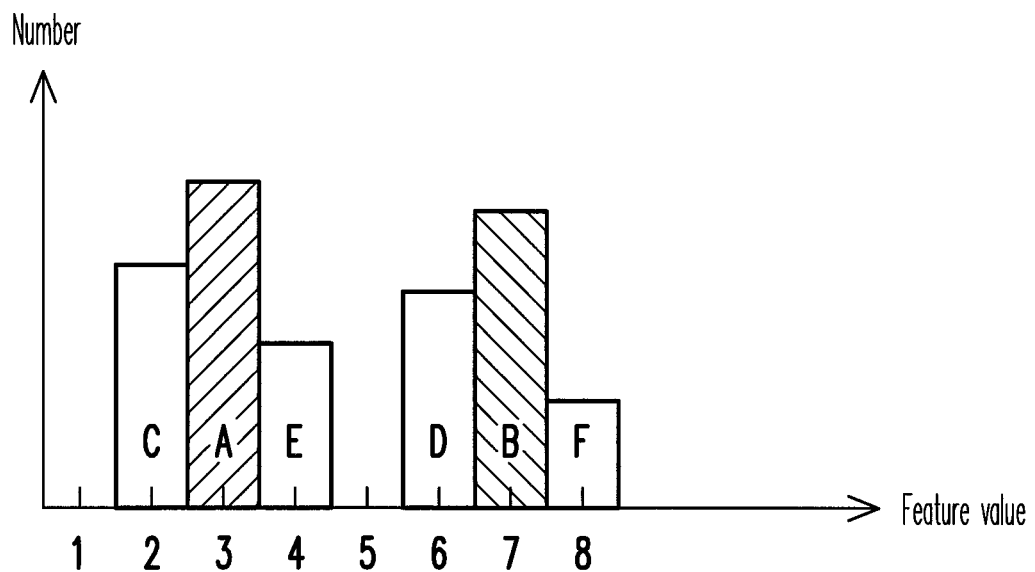

Referring to FIG. 3C, when the data input and data cluster output sub module 122 receives the data points of the sub color level B, the data group generation sub module 124 identifies that the first data group exists. Therefore, the data group generation sub module 124 calculates a feature value difference between the feature value of the data points belonging to the sub color level B and the feature value of the first data group. Here, the feature value difference between the feature value of the data points belonging to the sub color level B and the feature value of the first data group is 4. In the present example, since the feature value difference between the feature value of the data points belonging to the sub color level B and the feature value of the first data group is greater than the difference threshold, the data group generation sub module 124 generates a second data group, and groups the data points of the sub color level B into the second data group. Moreover, the feature updating module 126 calculates a feature value of the second data group. As shown in FIG. 4, the feature value of the second data group is set as 7, and the second data group includes the data points of the sub color level B.

Figure 3D:
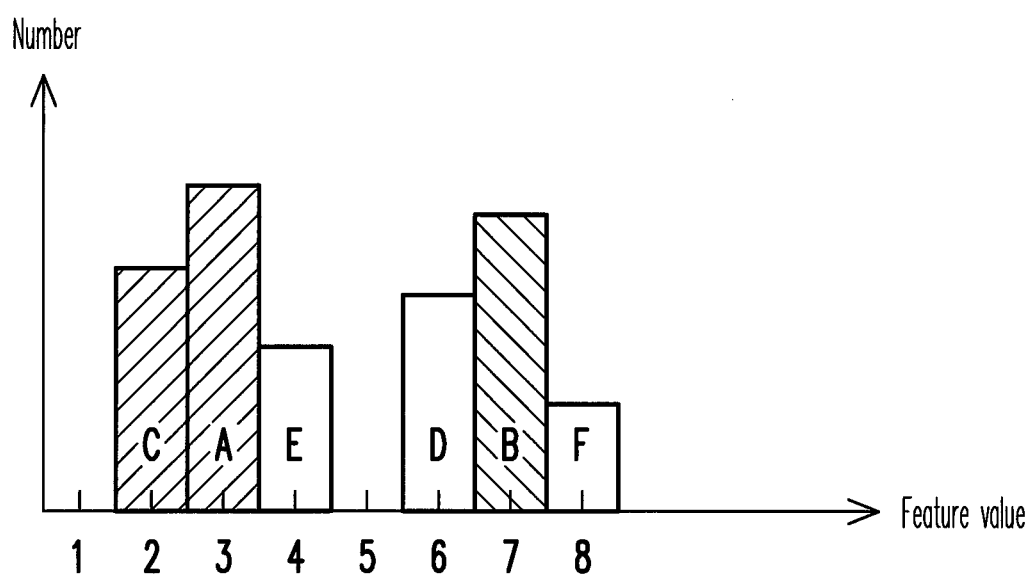

Referring to FIG. 3D, when the data input and data cluster output sub module 122 receives the data points of the sub color level C, the data group generation sub module 124 identifies that the first data group and the second data group exist. Therefore, the data group generation sub module 124 calculates the feature value difference between the feature value of the data points belonging to the sub color level C and the feature value of the first data group and the feature value difference between the feature value of the data points belonging to the sub color level C and the feature value of the second data group. Here, the feature value difference between the feature value of the data points belonging to the sub color level C and the feature value of the first data group is 1, and the feature value difference between the feature value of the data points belonging to the sub color level C and the feature value of the second data group is 5. In the present exemplary embodiment, since the feature value difference between the feature value of the data points belonging to the sub color level C and the feature value of the first data group is smaller than the difference threshold, and the feature value difference between the feature value of the data points belonging to the sub color level C and the feature value of the second data group is greater than the difference threshold, the data group generation sub module 124 groups the data points of the sub color level C into the first data group. Moreover, the feature updating module 126 updates the feature value of the first data group. For simplicity's sake, an average of the feature value of the sub color level A (i.e. 3) and the feature value of the sub color level C (i.e. 2) is taken as the feature value of the first data group. As shown in FIG. 4, the feature value of the first data group is updated to 2.5, and the first data group includes the data points of the sub color level A and the sub color level C.

Figure 3E:
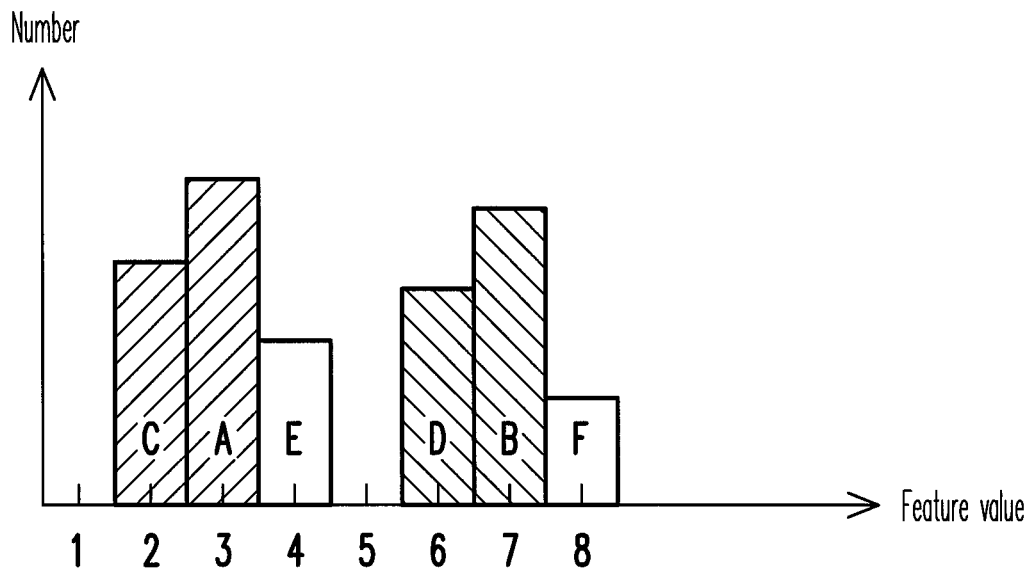

Referring to FIG. 3E, when the data input and data cluster output sub module 122 receives the data points of the sub color level D, the data group generation sub module 124 identifies that the first data group and the second data group exist. Therefore, the data group generation sub module 124 calculates the feature value difference between the feature value of the data points belonging to the sub color level D and the feature value of the first data group and the feature value difference between the feature value of the data points belonging to the sub color level D and the feature value of the second data group. Here, the feature value difference between the feature value of the data points belonging to the sub color level D and the feature value of the first data group is 3.5, and the feature value difference between the feature value of the data points belonging to the sub color level D and the feature value of the second data group is 1. In the present example, since the feature value difference between the feature value of the data points belonging to the sub color level D and the feature value of the first data group is greater than the difference threshold, and the feature value difference between the feature value of the data points belonging to the sub color level D and the feature value of the second data group is smaller than the difference threshold, the data group generation sub module 124 groups the data points of the sub color level D into the second data group. Moreover, the feature updating module 126 updates the feature value of the second data group. For simplicity's sake, an average of the feature value of the sub color level B (i.e. 7) and the feature value of the sub color level D (i.e. 6) is taken as the feature value of the second data group. As shown in FIG. 4, the feature value of the second data group is updated to 6.5, and the second data group includes the data points of the sub color level B and the sub color level D.

Figure 3F:
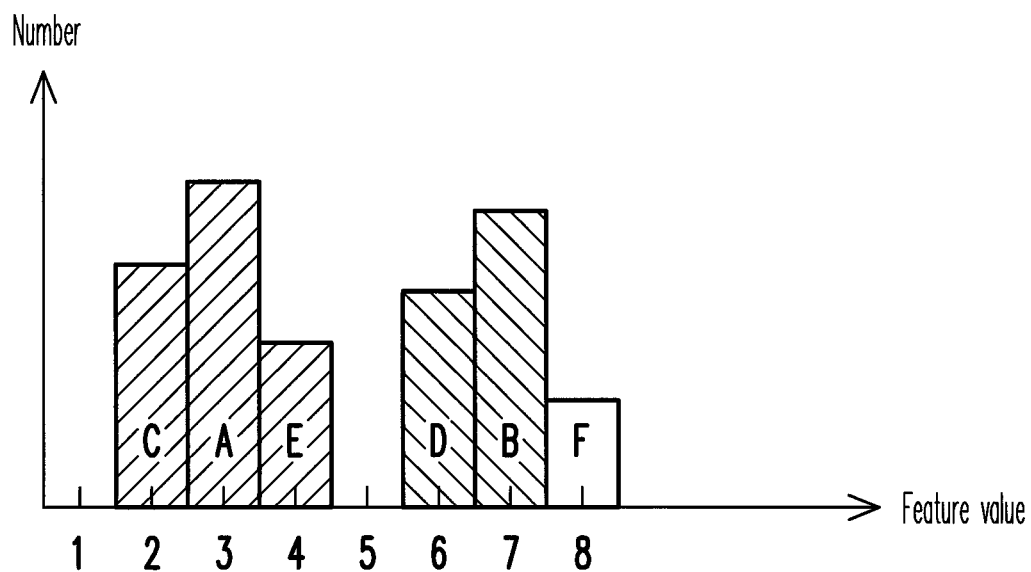

Referring to FIG. 3F, when the data input and data cluster output sub module 122 receives the data points of the sub color level E, the data group generation sub module 124 identifies that the first data group and the second data group exist. Therefore, the data group generation sub module 124 calculates the feature value difference between the feature value of the data points belonging to the sub color level E and the feature value of the first data group and the feature value difference between the feature value of the data points belonging to the sub color level E and the feature value of the second data group. Here, the feature value difference between the feature value of the data points belonging to the sub color level E and the feature value of the first data group is 1.5, and the feature value difference between the feature value of the data points belonging to the sub color level E and the feature value of the second data group is 2.5. In the present example, since the feature value difference between the feature value of the data points belonging to the sub color level E and the feature value of the first data group is smaller than the difference threshold, and the feature value difference between the feature value of the data points belonging to the sub color level E and the feature value of the second data group is greater than the difference threshold, the data group generation sub module 124 groups the data points of the sub color level E into the first data group. Moreover, the feature updating module 126 updates the feature value of the first data group. For simplicity's sake, an average of the feature value of the sub color level A (i.e. 3), the feature value of the sub color level C (i.e. 2) and the feature value of the sub color level E (i.e. 4) is taken as the feature value of the first data group. As shown in FIG. 4, the feature value of the first data group is updated to 3, and the first data group includes the data points of the sub color level A, the sub color level C and the sub color level E.

Figure 3G:
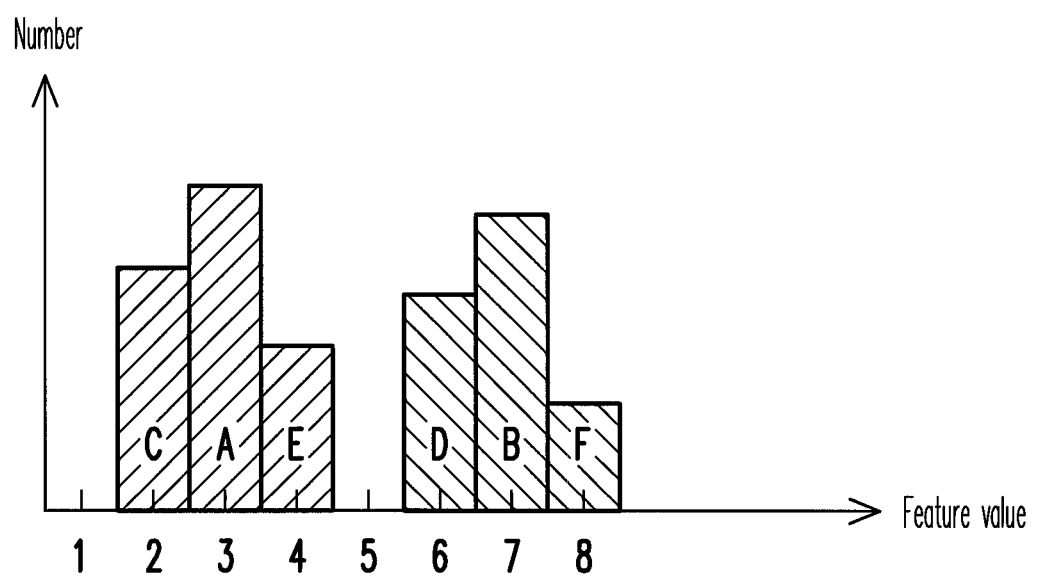

Referring to FIG. 3G, when the data input and data cluster output sub module 122 receives the data points of the sub color level F, the data group generation sub module 124 identifies that the first data group and the second data group exist. Therefore, the data group generation sub module 124 calculates the feature value difference between the feature value of the data points belonging to the sub color level F and the feature value of the first data group and the feature value difference between the feature value of the data points belonging to the sub color level F and the feature value of the second data group. Here, the feature value difference between the feature value of the data points belonging to the sub color level F and the feature value of the first data group is 5, and the feature value difference between the feature value of the data points belonging to the sub color level F and the feature value of the second data group is 1.5. In the present example, since the feature value difference between the feature value of the data points belonging to the sub color level F and the feature value of the first data group is greater than the difference threshold, and the feature value difference between the feature value of the data points belonging to the sub color level F and the feature value of the second data group is smaller than the difference threshold, the data group generation sub module 124 groups the data points of the sub color level F into the second data group. Moreover, the feature updating module 126 updates the feature value of the second data group. For simplicity's sake, an average of the feature value of the sub color level B (i.e. 7), the feature value of the sub color level D (i.e. 6) and the feature value of the sub color level F (i.e. 8) is taken as the feature value of the second data group. As shown in FIG. 4, the feature value of the second data group is updated to 7, and the second data group includes the data points of the sub color level B, the sub color level D and the sub color level F.

After all of the data points are grouped, the data input and data cluster output sub module 122 outputs the first data group and the second data group generated by the data group generation sub module 124 to serve as the data clusters corresponding to the received data. Namely, after the input data (shown in FIG. 3A) is grouped, the data input and data cluster output sub module 122 outputs the data cluster, which contains the data points of the sub color level A, the sub color level C and the sub color level E, and the data cluster, which contains the data points of the sub color level B, the sub color level D and the sub color level F.

Referring to FIG. 1, the data post-processing module 116 is configured for optimizing the data clusters generated by the data clustering device 114. In detail, the data post-processing module 116 confirms whether the data clusters generated by the data clustering device 114 are suitable. Moreover, when the data clusters generated by the data clustering device 114 are not suitable, the data post-processing module 116 combines a part of the data clusters to achieve the optimization.

For example, in the present exemplary embodiment, the data post-processing module 116 determines whether the generated data clusters have isolated data points or over-divided data clusters.

The so-called isolated data point refers to that when the surrounding data points of a certain data point (or a data group) belonged to a data cluster are belonged to another data cluster, such data point (or such data group) is regarded as the so-called isolated data point.

Figure 5A:
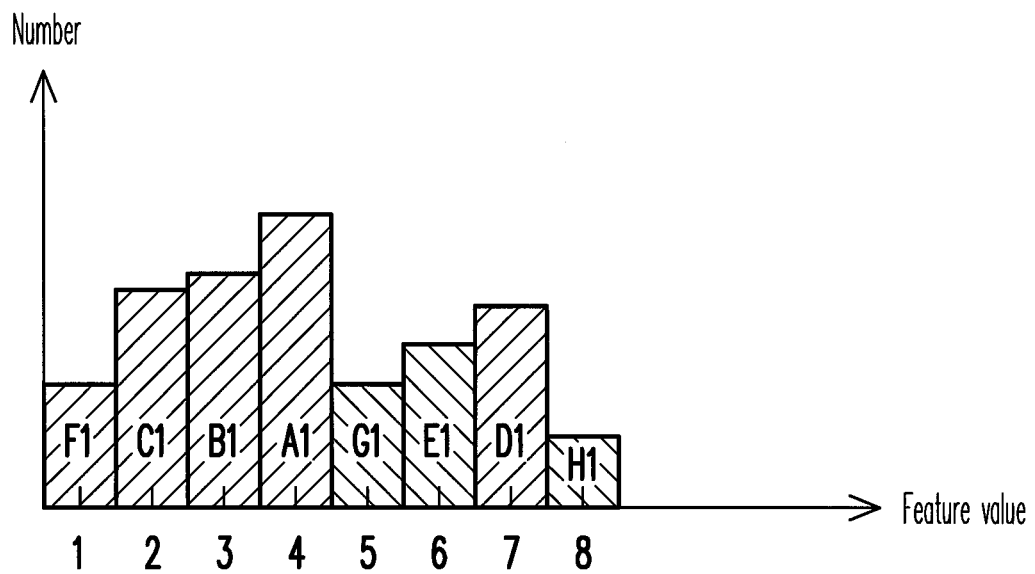
FIG. 5A is a schematic diagram illustrating isolated data points according to the first exemplary embodiment of the disclosure.
Figure 5B:
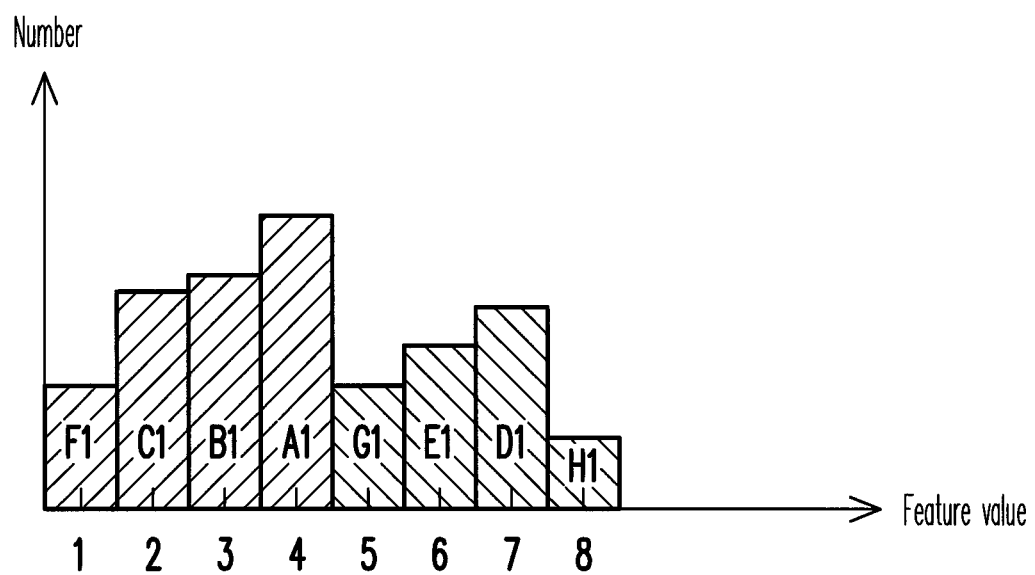
FIG. 5B is a schematic diagram of optimizing data clusters according to FIG. 5A.

FIG. 5A is a schematic diagram illustrating isolated data points according to the first exemplary embodiment of the disclosure, and FIG. 5B is a schematic diagram of optimizing data clusters according to FIG. 5A.

Referring to FIG. 5A, when the data points of the image data are respectively belonged to sub color levels A1, B1, C1, D1, E1, F1, G1 and H1, and the data clustering device 114 clusters the first data cluster containing the data points of the sub color level F1, the sub color level C1, the sub color level B1, the sub color level A1 and the sub color level D1 and the second data cluster containing the data points of the sub color level G1, the sub color level E1 and the sub color level H1, the data post-processing module 116 identifies that the surrounding data points (i.e. the data points of the sub color level E1 an the data points of the sub color level H1) of the data points of the sub color level D1 are all belonged to the second data cluster, so that the data post-processing module 116 moves the data points of the sub color level D1 from the first data cluster to the second data cluster (as shown in FIG. 5B).

The so-called over-divided data cluster refers to that when the number of data points of a boundary data cluster is smaller than a data point number threshold, the boundary data cluster is referred to as the over-divided data cluster. Here, the data point number threshold can be set by the user according to a pattern of the data to be clustered.

Figure 6A:
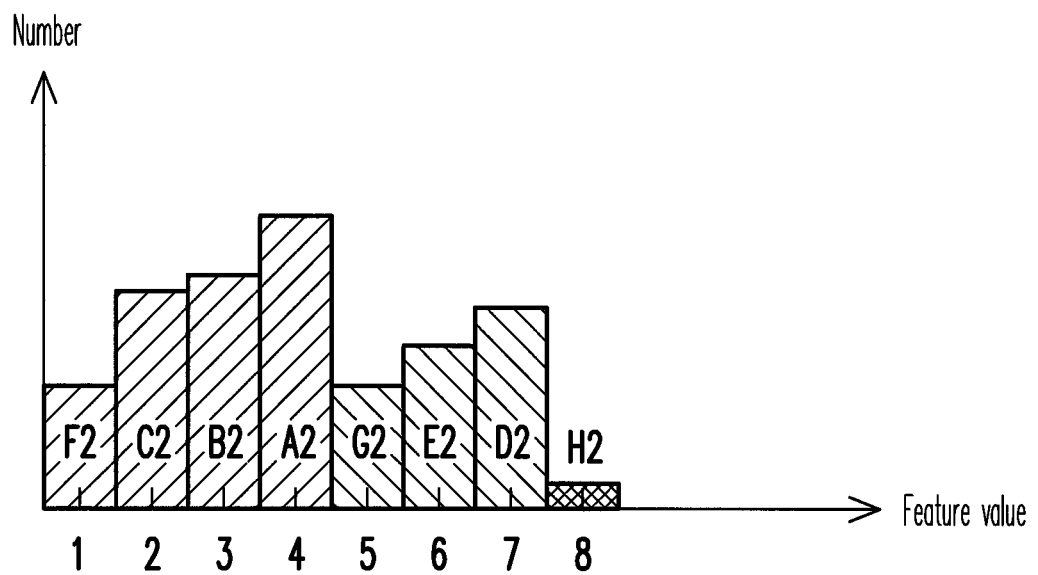
FIG. 6A is a schematic diagram illustrating an over-divided data cluster according to the first exemplary embodiment of the disclosure.
Figure 6B:
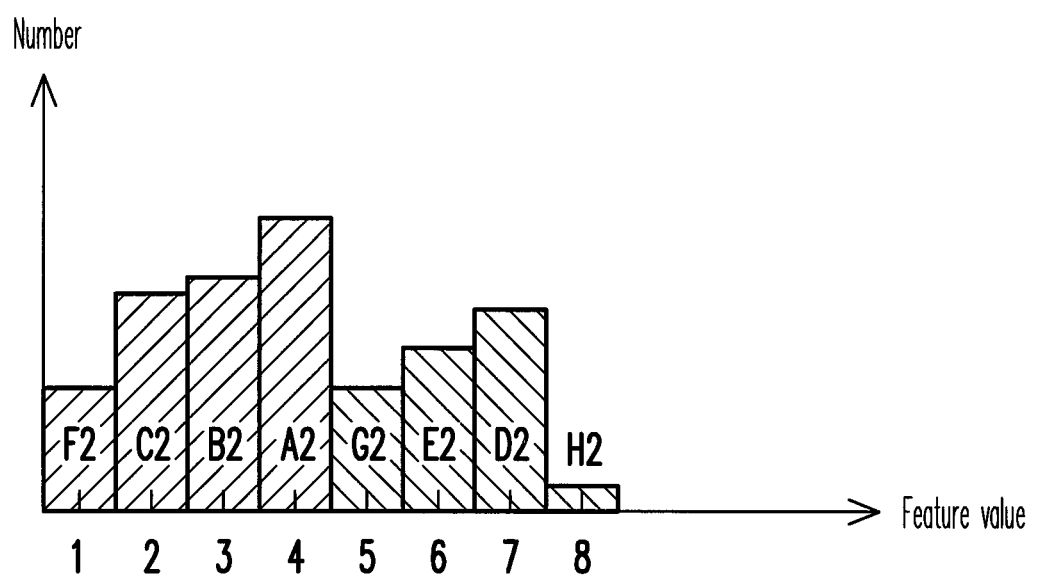
FIG. 6B is a schematic diagram of optimizing data clusters according to FIG. 6A.

FIG. 6A is a schematic diagram illustrating an over-divided data cluster according to the first exemplary embodiment of the disclosure, and FIG. 6B is a schematic diagram of optimizing data clusters according to FIG. 6A.

Referring to FIG. 6A, when the data points of the image data are respectively belonged to sub color levels A2, B2, C2, D2, E2, F2, G2 and H2, and the data clustering device 114 clusters the first data cluster containing the data points of the sub color level F2, the sub color level C2, the sub color level B2 and the sub color level A2, the second data cluster containing the data points of the sub color level G2, the sub color level E2 and the sub color level D2, and a third data cluster containing the data points of the sub color level H2, as shown in FIG. 6B, the data post-processing module 116 identifies that the number of the data points of the third data cluster (i.e. the boundary data cluster) is smaller than the data point number threshold, and combines the third data cluster with the second data cluster (i.e. an adjacent data cluster thereof).

After the above optimization is completed, the data post-processing module 116 outputs the optimized data clusters. For example, in another exemplary embodiment of the disclosure, the image processing apparatus 10 further includes a display unit (not shown), which is configured for displaying the clustering result generated by the data processing device 108.

It should be noticed that in the disclosure, the data pre-processing module 112, the data clustering device 114 and the data post-processing module 116 can be implemented by hardware or software.

Figure 7:
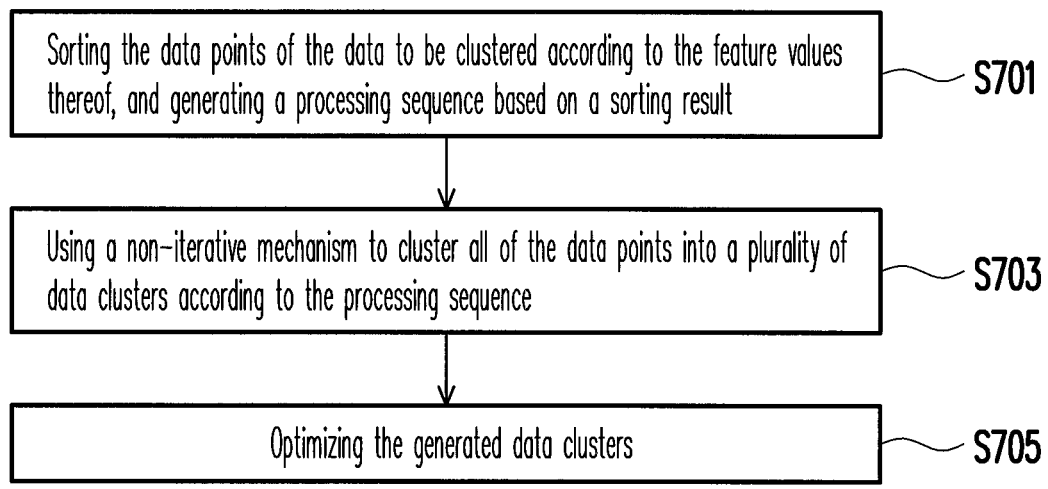
FIG. 7 is a flowchart illustrating a data clustering method according to the first exemplary embodiment of the disclosure.

FIG. 7 is a flowchart illustrating a data clustering method according to the first exemplary embodiment of the disclosure.

Referring to FIG. 7, first, in step S701, the data points of the data to be clustered are sorted according to the feature values thereof, and a processing sequence is generated based on a sorting result. The methods for sorting the data points and generating the processing sequence have been described above with FIG. 2, so that detailed descriptions thereof are not repeated. It should be noticed that in another exemplary embodiment of the disclosure, the step S701 can be omitted without sorting the data points. For example, when an online real-time clustering is performed, since it is inapplicable to sort the data after all of the data are received, in this example, the data points of the data to be clustered are transmitted to the data clustering device 114 according to a receiving sequence in a first in first out (FIFO) manner.

Then, in step S703, a non-iterative mechanism is used to cluster all of the data points into a plurality of data clusters according to the processing sequence.

Figure 8:
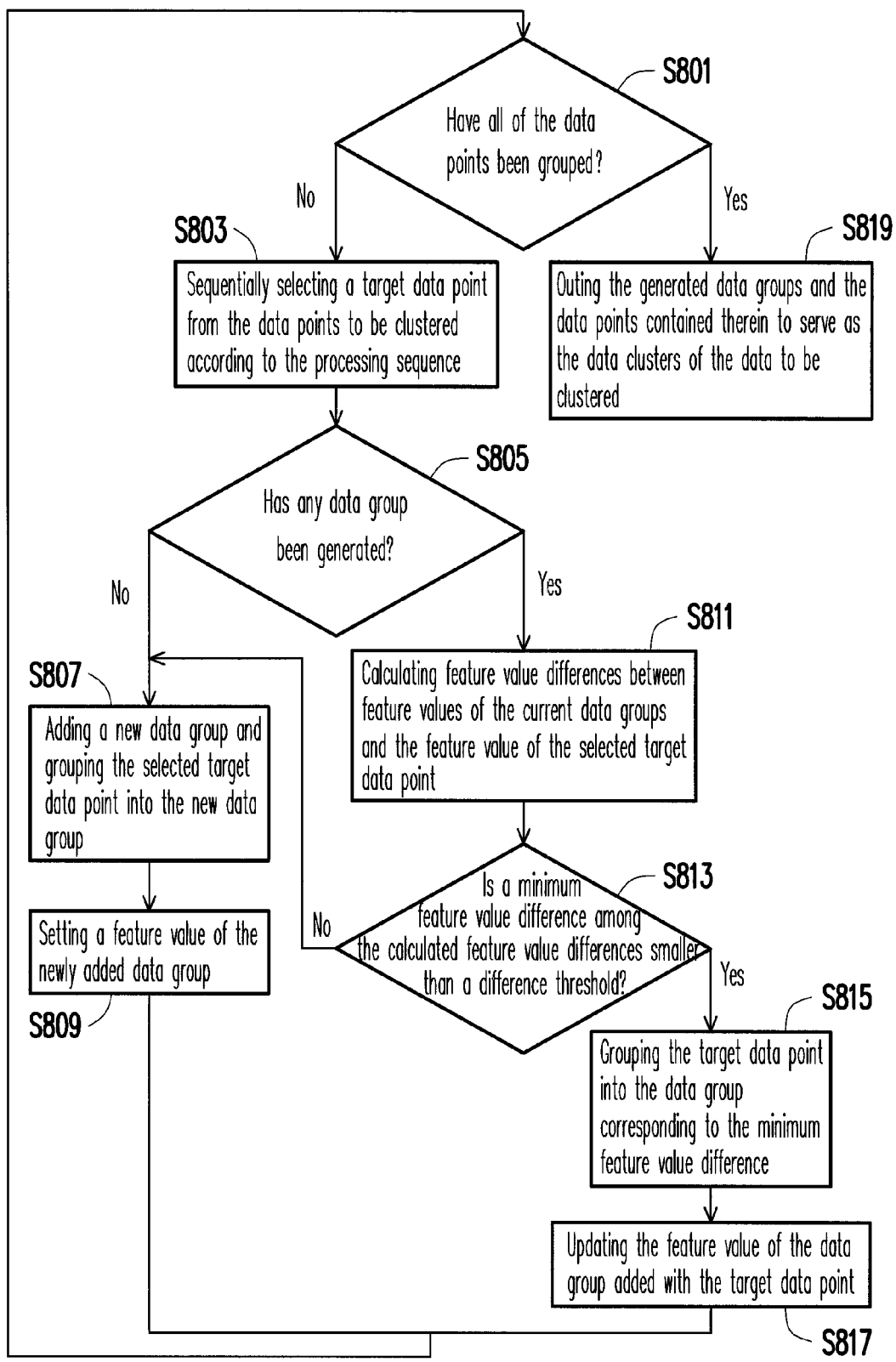
FIG. 8 is a flowchart illustrating detailed steps of a step S703 of FIG. 7.

FIG. 8 is a flowchart illustrating detailed steps of the step S703 of FIG. 7.

Referring to FIG. 8, first, in step S801, it is determined whether all of the data points have been grouped.

If any data point is still not grouped, in step S803, a target data point is sequentially selected from the data points to be clustered according to the processing sequence.

Then, in step S805, it is determined whether any data group has been generated.

If no data group is generated, in step S807, a new data group is added and the selected target data point is grouped into the new data group. Then, in step S809, a feature value of the newly added data group is set.

If data groups already exist, in step S811, feature value differences between feature values of the current data groups and the feature value of the selected target data point are calculated, and in step S813, it is determined whether a minimum feature value difference among the calculated feature value differences is smaller than a difference threshold.

If the minimum feature value difference is not smaller than the difference threshold, the step S807 is executed.

If the minimum feature value difference is smaller than the difference threshold, in step S815, the target data point is grouped to a data group corresponding to the minimum feature value difference. Then, in step S817, the feature value of the data group added with the target data point is updated.

After the step S809 and the step S817 are completed, the step S801 is re-executed to confirm whether all of the data points have been grouped.

If all of the data points have been grouped, in step S819, the generated data groups and the data points contained therein are output to serve as the data clusters of the data to be clustered.

Referring to FIG. 7, finally, in step S705, the generated data clusters are optimized. For example, as described above, optimization of the data clusters includes processing of the isolated data points and processing of the over-divided data clusters.

Figure 9:
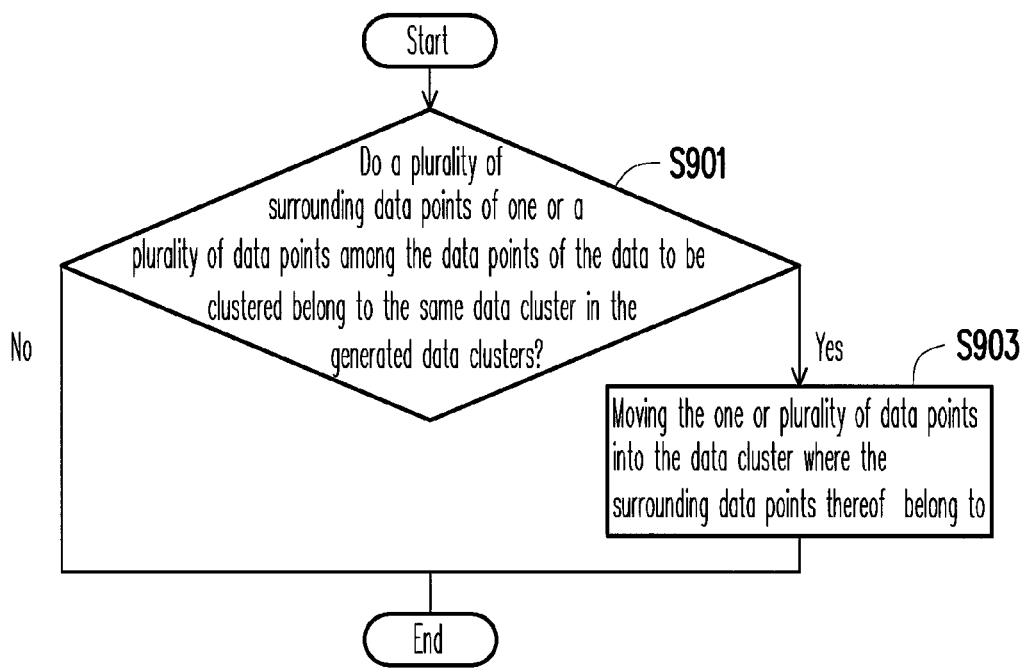
FIG. 9 is a flowchart illustrating a method of processing isolated data points according to the first exemplary embodiment of the disclosure.

FIG. 9 is a flowchart illustrating a method of processing the isolated data points according to the first exemplary embodiment of the disclosure.

Referring to FIG. 9, first, in step S901, it is determined whether a plurality of surrounding data points of one or a plurality of data points in the data points of the data to be clustered is belonged to a same data cluster in the generated data clusters.

If the surrounding data points of one or a plurality of the data points in the data points of the data to be clustered are belonged to the same data cluster in the generated data clusters, in step S903, the one or a plurality of the data points is moved to the data cluster where the surrounding data points thereof are belonged to.

Figure 10:
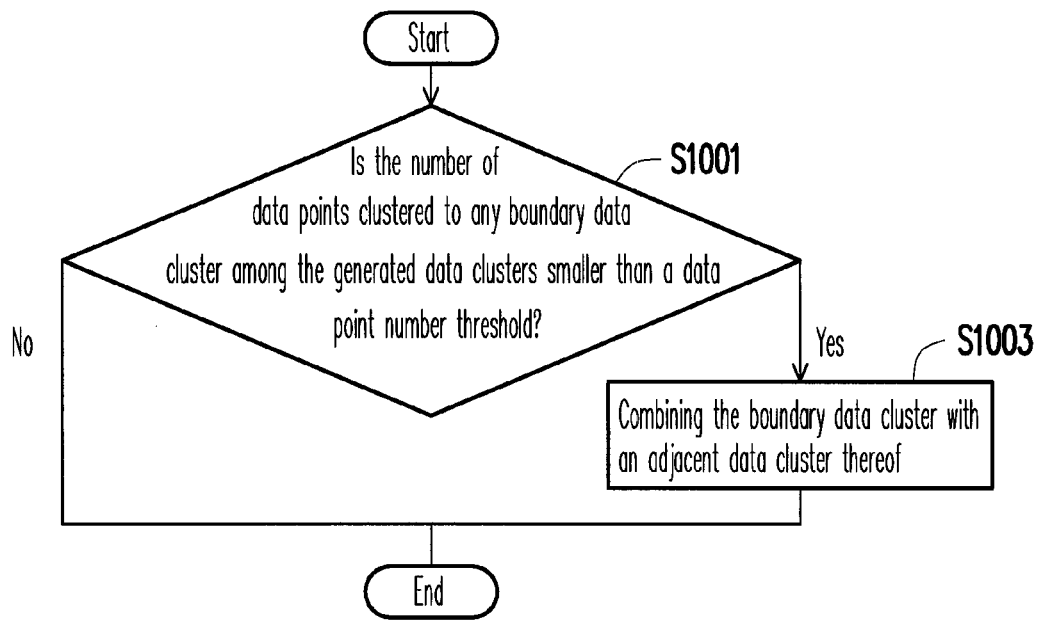
FIG. 10 is a flowchart illustrating a method for processing an over-divided data cluster according to the first exemplary embodiment of the disclosure.

FIG. 10 is a flowchart illustrating a method for processing the over-divided data cluster according to the first exemplary embodiment of the disclosure.

Referring to FIG. 10, first, in step S1001, it is determined whether the number of data points clustered to any boundary data cluster in the generated data clusters is smaller than a data point number threshold.

If the number of the data points clustered to any boundary data cluster in the generated data clusters is smaller than the data point number threshold, in step S1003, the boundary data cluster is combined with an adjacent data cluster thereof.

Second Exemplary Embodiment

The data clustering method of the second exemplary embodiment is substantially the same to the data clustering method of the first exemplary embodiment, and a difference there between lies in a setting method of the difference threshold. In the data clustering method of the first exemplary embodiment, the difference threshold is set as a fixed value for determining whether the target data point can be grouped to the current data groups. However, in the second exemplary embodiment, the difference threshold is dynamically varied corresponding to the data groups. Namely, each data group has a corresponding difference threshold, and when it is determined whether the target data point can be grouped to the current data groups, the determination is performed based on the difference threshold corresponding to each of the data groups. The difference between the second exemplary embodiment and the first exemplary embodiment is described below.

Figure 11:
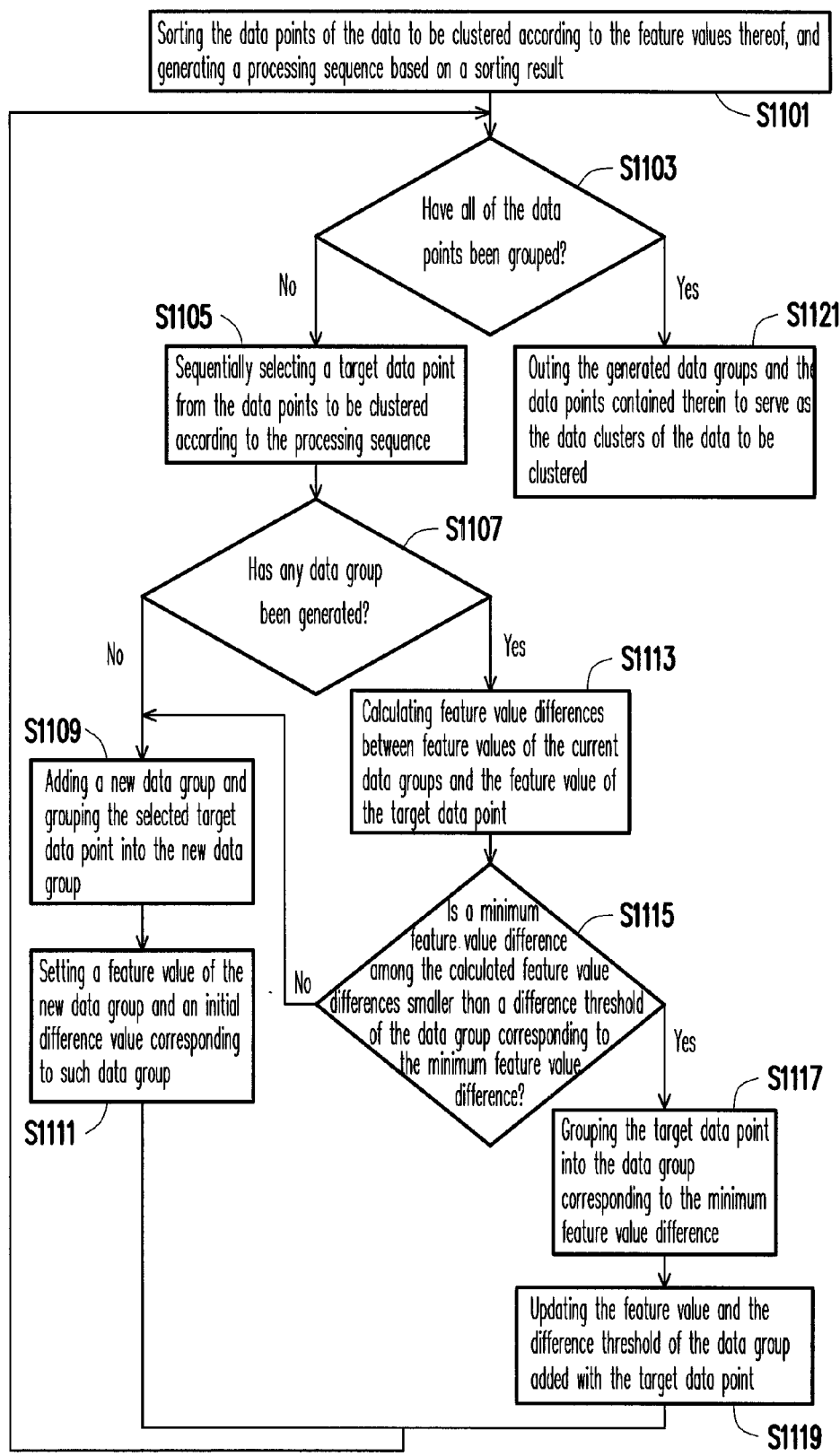
FIG. 11 is a flowchart illustrating a data clustering method according to a second exemplary embodiment of the disclosure.

FIG. 11 is a flowchart illustrating a data clustering method according to the second exemplary embodiment of the disclosure.

Referring to FIG. 11, first, in step S1101, the data pre-processing module 112 sorts the data points of the data to be clustered according to the feature values thereof, and generates a processing sequence based on a sorting result. The method for sorting the data points of the present exemplary embodiment is the same to that of the first exemplary embodiment, so that a detailed description thereof is not repeated. It should be noted that in the present exemplary embodiment, although the processing sequence is generated based on the sorting result, in another exemplary embodiment of the disclosure, the data pre-processing module 112 can also generate the processing sequence according to a receiving sequence of the data points without sorting.

Then, in step S1103, the data input and data cluster output sub module 122 determines whether all of the data points have been grouped.

If any data point is still not grouped, in step S1105, the data input and data cluster output sub module 122 sequentially selects a target data point from the data points to be clustered according to the processing sequence.

Then, in step S1107, the data group generation sub module 124 determines whether any data group has been generated.

If no data group is generated, in step S1109, the data group generation sub module 124 adds a new data group and groups the selected target data point into the new data group. Then, in step S1111, the feature updating module 126 sets a feature value of the new data group and an initial difference value corresponding to such data group.

If data groups already exist, in step S1113, the data group generation sub module 124 calculates feature value differences between feature values of the current data groups and the feature value of the target data point, and in step S1115, the data group generation sub module 124 determines whether a minimum feature value difference in the calculated feature value differences is smaller than a difference threshold of the data group corresponding to the minimum feature value difference.

If the minimum feature value difference is not smaller than the corresponding difference threshold, the data group generation sub module 124 executes the step S1109.

If the minimum feature value difference is smaller than the corresponding difference threshold, in step S1117, the data group generation sub module 124 groups the target data point into a data group corresponding to the minimum feature value difference. Then, in step S1119, the feature updating module 126 updates the feature value and the difference threshold of the data group added with the target data point.

For example, in the second exemplary embodiment, the feature value and the difference threshold of the corresponding data group are updated according to following equations (1)-(4):

$$r'_i = (N_i \times r_i + r_s)/(N_i + 1) \quad (1)$$

$$D'_i = (1-w) \times D_i + w \times D_s \quad (2)$$

$$D_s = r_i - r_s \quad (3)$$

$$w = D_s/(2 \times D_i) \quad (4)$$

Where, $r'_i$ is a feature value of an $i^{th}$ data group added with an $s^{th}$ data point, $D'_i$ is a difference threshold of the $i^{th}$ data group added with the $s^{th}$ data point, $N_i$ is the number of the data points of the $i^{th}$ data group before the $s^{th}$ data point is added, $r_i$ is a feature value of the $i^{th}$ data group before $s^{th}$ data point is added, $r_s$ is a feature value of the $s^{th}$ data point, $D_s$ is a feature value difference between the feature value of the $i^{th}$ data group and the feature value of the $s^{th}$ data point, and w is a weight value.

After the step S1111 and the step S1119 are completed, the step S1103 is re-executed to confirm whether all of the data points have been grouped.

If all of the data points have been grouped, in step S1121, the generated data groups and the data points contained therein are output to serve as the data clusters of the data to be clustered.

In the second exemplary embodiment, since the difference threshold is dynamically adjusted along with the feature value of the data point of the data group, generation of the isolated data points and the over-divided data clusters can be reduced. Therefore, in the second exemplary embodiment of the disclosure, it is unnecessary to execute the step of optimizing the data clusters (i.e. the step S705 of the first exemplary embodiment). However, the disclosure is not limited thereto, and in the exemplary embodiment that the difference threshold is dynamically adjusted, the step of optimizing the data clusters can also be executed, so as to ensure the quality of the clustering.

In summary, the data clustering method and the device thereof provided by the exemplary embodiments of the disclosure, and the image processing apparatus and the data processing apparatus using the same can quickly cluster the data points of the data (for example, the image data) without applying an iterative operation, so that data transmission cost can be greatly reduced, and performance of the embedded system can be improved.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data clustering method, for clustering a plurality of data points, wherein each of the data points has at least one feature value, and the data clustering method comprising:

sorting the data points and generating a processing sequence based on a sorting result;

using a non-iterative mechanism to cluster the data points into a plurality of data clusters according to the processing sequence; and optimizing the generated data clusters, wherein the step of using the non-iterative mechanism to cluster the data points into the data clusters according to the processing sequence comprises:
sequentially selecting a target data point from the data points according to the processing sequence;
determining whether any data group has been generated;
when one or a plurality of current data groups has been generated, calculating one or a plurality of feature value differences between one or a plurality of feature values corresponding to the one or plurality of current data groups and the feature value of the target data point and identifying a minimum feature value difference among the one or plurality of feature value differences;
determining whether the minimum feature value difference is smaller than a difference threshold of a data group corresponding to the minimum feature value difference among the one or plurality of current data groups;
adding the target data point into the data group corresponding to the minimum feature value difference when the minimum feature value difference is smaller than the difference threshold of the data group corresponding to the minimum feature value difference; and
updating the difference threshold of the data group added with the target data point according to the feature value of the target data point and a weight value.

2. The data clustering method as claimed in claim 1, wherein the step of sorting the data points and generating the processing sequence based on the sorting result comprises:
sorting the data points according to the feature values of the data points, and generating the processing sequence based on the sorting result.

3. The data clustering method as claimed in claim 1, wherein the step of sorting the data points and generating the processing sequence based on the sorting result comprises:
sorting the data points according to a receiving sequence of the data points, and generating the processing sequence based on the sorting result.

4. The data clustering method as claimed in claim 1, wherein the step of using the non-iterative mechanism to cluster the data points into the data clusters according to the processing sequence further comprises:
adding a new data group and grouping the target data point into the new data group when no data group is generated or when the minimum feature value difference is not smaller than the difference threshold of the data group corresponding to the minimum feature value difference;
updating the feature value of the data group added with the target data point, wherein the feature value of the data group added with the target data point is obtained by averaging the feature values of the data points belonged to the data group added with the target data point; and
determining whether all of the data points have been grouped, wherein when all of the data points have been grouped, the generated data groups are served as the data clusters, and when any data point among the data points is not grouped, another target data point is selected from the data points according to the processing sequence.

5. The data clustering method as claimed in claim 1, wherein the step of optimizing the generated data clusters comprises:
determining whether a plurality of surrounding data points of one or a plurality of data points among the data points belong to the same data cluster among the data clusters; and
moving the one or plurality of data points to the same data cluster when the surrounding data points of the one or plurality of the data points belong to the same data cluster among the data clusters.

6. The data clustering method as claimed in claim 1, wherein the step of optimizing the generated data clusters comprises:
determining whether the number of data points grouped to a boundary data cluster among the data clusters is smaller than a data point number threshold; and
combining the boundary data cluster with an adjacent data cluster among the data clusters when the number of the data points grouped to the boundary data cluster is smaller than the data point number threshold.

7. A data clustering method for using a non-iterative mechanism to cluster a plurality of data points into a plurality of data clusters, wherein each of the data points has at least one feature value, and the data clustering method comprising:
selecting a target data point from the data points;
determining whether any data group has been generated, wherein when no data group is generated, a step (a) is executed, and when one or a plurality of data groups has been generated, a step (b) is executed;
(a) adding a new data group and grouping the target data point into the new data group;
(b) calculating one or a plurality of feature value differences between one or a plurality of feature values corresponding to the one or plurality of data groups and the feature value of the target data point, identifying a minimum feature value difference among the one or plurality of feature value differences, and determining whether the minimum feature value difference is smaller than a difference threshold of a data group corresponding to the minimum feature value difference among the one or plurality of data groups, wherein when the minimum feature value difference is not smaller than the difference threshold of the data group corresponding to the minimum feature value difference, the step (a) is executed, and when the minimum feature value difference is smaller than the difference threshold of the data group corresponding to the minimum feature value difference, the target data point is grouped into the data group corresponding to the minimum feature value difference;
updating the difference threshold of the data group added with the target data point according to the feature value of the target data point and a weight value;
updating the feature value of the data group added with the target data point, wherein the feature value of the data group added with the target data point is obtained by averaging the feature values of the data points belonged to the data group added with the target data point; and
determining whether all of the data points have been grouped, wherein when all of the data points have been grouped, the generated data groups are served as the data clusters, and when any data point among the data points is not grouped, the step (a) is re-executed.

8. The data clustering method as claimed in claim 7, wherein the step (a) comprises:
sequentially selecting the target data point from the data points according to a receiving sequence of the data points.

9. The data clustering method as claimed in claim 7, wherein the step (a) comprises:
sorting the data points according to the feature values of the data points, and generating a processing sequence based on a sorting result; and sequentially selecting the target data point from the data points according to the processing sequence.

10. A data processing apparatus, for clustering a plurality of data points, wherein each of the data points has at least one feature value, and the data processing apparatus comprising:
   a data pre-processing module, configured to store the data points and generate a processing sequence based on a sorting result;
   a data clustering device, configured to use a non-iterative mechanism to cluster the data points into a plurality of data clusters according to the processing sequence; and
   a data post-processing module, configured to optimize the generated data clusters,
   wherein the data clustering device is further configured to sequentially select a target data point from the data points according to the processing sequence and determine whether any data group has been generated, wherein when one or a plurality of current data groups has been generated, the data clustering device is configured to calculate one or a plurality of feature value differences between one or a plurality of feature values corresponding to the one or plurality of current data groups and the feature value of the target data point, identifies a minimum feature value difference among the one or plurality of feature value differences, and determines whether the minimum feature value difference is smaller than a difference threshold of a data group corresponding to the minimum feature value difference among the one or plurality of current data groups, wherein when the minimum feature value difference is smaller than the difference threshold of the data group corresponding to the minimum feature value difference, the data clustering device is configured to group the target data point into the data group corresponding to the minimum feature value difference and update the difference threshold of the data group added with the target data point according to the feature value of the target data point and a weight value.

11. The data processing apparatus as claimed in claim 10, wherein the data pre-processing module sorts the data points according to the feature values of the data points, and generates the processing sequence based on the sorting result.

12. The data processing apparatus as claimed in claim 10, wherein the data pre-processing module sorts the data points according to a receiving sequence of the data points, and generates the processing sequence based on the sorting result.

13. The data processing apparatus as claimed in claim 10, wherein the data clustering device comprises:
   a data input and data cluster output sub module;
   a data group generation sub module, coupled to the data input and data cluster output sub module; and
   a feature updating module, coupled to the data input and data cluster output sub module,
   wherein the data input and data cluster output sub module is configured to sequentially select a target data point from the data points according to the processing sequence,
   wherein the data group generation sub module is configured to determine whether any data group has been generated,
   wherein when no data group is generated, the data group generation sub module adds a new data group and groups the target data point selected by the data input and data cluster output sub module into the new data group,
   wherein when one or a plurality of data groups has been generated, the data group generation sub module calculates one or a plurality of feature value differences between one or a plurality of feature values corresponding to the one or plurality of current data groups and the feature value of the target data point, identifies a minimum feature value difference among the one or plurality of feature value differences, and determines whether the minimum feature value difference is smaller than a difference threshold of a data group corresponding to the minimum feature value difference among the one or plurality of data groups,
   wherein when the minimum feature value difference is not smaller than the difference threshold of the data group corresponding to the minimum feature value difference, the data group generation sub module adds a new data group and grouping the target data point to the new data group,
   wherein when the minimum feature value difference is smaller than the difference threshold of the data group corresponding to the minimum feature value difference, the data group generation sub module groups the target data point into the data group corresponding to the minimum feature value difference,
   wherein the feature updating module is configured to update the feature value of the data group added with the target data point, wherein the feature value of the data group added with the target data point is obtained by averaging the feature values of the data points belonged to the data group added with the target data point,
   wherein the data input and data cluster output sub module determines whether all of the data points have been grouped,
   wherein when all of the data points have been grouped, the data input and data cluster output sub module takes the generated data groups as the data clusters,
   wherein when any data point among the data points is not grouped, the data input and data cluster output sub module sequentially selects another target data point from the data points according to the processing sequence.

14. The data processing apparatus as claimed in claim 10, wherein the data post-processing module determines whether a plurality of surrounding data points of one or a plurality of data points among the data points belong to the same data cluster among the data clusters,
   wherein when the surrounding data points of the one or plurality of data points belong to the same data cluster among the data clusters, the data post-processing module moves the one or plurality of data points into the same data cluster.

15. The data processing apparatus as claimed in claim 10, wherein the data post-processing module determines whether the number of data points grouped to a boundary data cluster among the data clusters is smaller than a data point number threshold,
   wherein when the number of the data points grouped to the boundary data cluster is smaller than the data point number threshold, the data post-processing module combines the boundary data cluster with an adjacent data cluster among the data clusters.

16. A data clustering device, for using a non-iterative mechanism to cluster a plurality of data points into a plurality of data clusters, wherein each of the data points has at least one feature value, and the data clustering device comprising:
   a data input and data cluster output sub module;
   a data group generation sub module, coupled to the data input and data cluster output sub module; and
   a feature updating module, coupled to the data input and data cluster output sub module, wherein the data input and data cluster output sub module is configured to sequentially selects a target data point from the data points, wherein the data group generation sub module is configured to determine whether any data group has been generated, wherein when no data group is generated, the data group generation sub module adds a new data group and groups the target data point selected by the data input and data cluster output sub module into the new data group, wherein when one or a plurality of data groups has been generated, the data group generation sub module calculates one or a plurality of feature value differences between one or a plurality of feature values corresponding to the one or plurality of data groups and the feature value of the target data point, identifies a minimum feature value difference among the one or plurality of feature value differences, and determines whether the minimum feature value difference is smaller than a difference threshold of a data group corresponding to the minimum feature value difference in the one or plurality of data groups, wherein when the minimum feature value difference is not smaller than the difference threshold of the data group corresponding to the minimum feature value difference, the data group generation sub module adds a new data group and groups the selected target data point into the new data group, wherein when the minimum feature value difference is smaller than the difference threshold of the data group corresponding to the minimum feature value difference, the data group generation sub module groups the target data point into the data group corresponding to the minimum feature value difference, wherein the feature updating module is configured to update the feature value of the data group added with the target data point, wherein the feature value of the data group added with the target data point is obtained by averaging the feature values of the data points belonged to the data group added with the target data point, wherein the data input and data cluster output sub module determines whether all of the data points have been grouped, wherein the feature updating module updates the difference threshold of the data group added with the target data point according to the feature value of the target data point and a weight value, wherein when all of the data points have been grouped, the data input and data cluster output sub module takes the generated data groups as the data clusters, wherein when any data point in the data points is not grouped, the data input and data cluster output sub module sequentially selects another target data point from the data points.

17. An image processing apparatus, comprising:
an image sensing device, configured to capture an image, wherein the image has a plurality of data points and each of the data points has at least one feature value;
a data pre-processing module, configured to sort the data points and generating a processing sequence based on a sorting result;
a data clustering device, configured to use a non-iterative mechanism to cluster the data points into a plurality of data clusters according to the processing sequence, wherein the data clustering device sequentially selects a target data point from the data points according to the processing sequence, and determines whether any data group has been generated, wherein when one or a plurality of current data groups has been generated, the data clustering device calculates one or a plurality of feature value differences between one or a plurality of feature values corresponding to the one or plurality of current data groups and the feature value of the selected target data point, identifies a minimum feature value difference among the one or plurality of feature value differences, and determines whether the minimum feature value difference is smaller than a difference threshold of a data group corresponding to the minimum feature value difference among the one or plurality of current data groups, and wherein when the minimum feature value difference is smaller than the difference threshold of the data group corresponding to the minimum feature value difference, the data clustering device groups the target data point into the data group corresponding to the minimum feature value difference and updates the difference threshold of the data group added with the target data point according to the feature value of the target data point and a weight value; and
a data post-processing module, configured to optimize the generated data clusters, wherein at least one data points of one of the data clusters is moved to another data cluster.

18. The image processing apparatus as claimed in claim 17, wherein the data pre-processing module sorts the data points according to the feature values of the data points, and generates the processing sequence based on the sorting result.

19. The image processing apparatus as claimed in claim 17, wherein the data pre-processing module sorts the data points according to a receiving sequence of the data points, and generates the processing sequence based on the sorting result.

20. The image processing apparatus as claimed in claim 17, wherein the data clustering device comprises:
a data input and data cluster output sub module;
a data group generation sub module, coupled to the data input and data cluster output sub module; and
a feature updating module, coupled to the data input and data cluster output sub module,
wherein the data input and data cluster output sub module is configured to sequentially selects a target data point from the data points according to the processing sequence,
wherein the data group generation sub module is configured to determine whether any data group has been generated,
wherein when no data group is generated, the data group generation sub module adds a new data group and groups the target data point selected by the data input and data cluster output sub module into the new data group,
wherein when the one or a plurality of data groups has been generated, the data group generation sub module calculates the one or a plurality of feature value differences between the one or a plurality of feature values corresponding to the one or plurality of current data groups and the feature value of the selected target data point, identifies a minimum feature value difference among the one or plurality of feature value differences, and determine whether the minimum feature value difference is smaller than a difference threshold of a data group corresponding to the minimum feature value difference among the one or plurality of data groups,
wherein when the minimum feature value difference is not smaller than the difference threshold of the data group corresponding to the minimum feature value difference, the data group generation sub module adds a new data group and groups the target data point into the new data group, wherein when the minimum feature value difference is smaller than the difference threshold of the data group corresponding to the minimum feature value difference, the data group generation sub module groups the target data point into the data group corresponding to the minimum feature value difference, wherein the feature updating module is configured to update the feature value of the data group added with the target data point, wherein the feature value of the data group added with the target data point is obtained by averaging the feature values of the data points belonged to the data group added with the target data point, wherein the data input and data cluster output sub module determines whether all of the data points have been grouped, wherein when all of the data points have been grouped, the data input and data cluster output sub module takes the generated data groups as the data clusters, wherein when any data point in the data points is not grouped, the data input and data cluster output sub module sequentially selects another target data point from the data points according to the processing sequence.

21. The image processing apparatus as claimed in claim 17, wherein the data post-processing module determines whether a plurality of surrounding data points of one or a plurality of data points in the data points belong to the same data cluster among the data clusters, wherein when the surrounding data points of the one or plurality of data points belong to the same data cluster among the data clusters, the data post-processing module moves the one or plurality of data points into the same data cluster.

22. The image processing apparatus as claimed in claim 17, wherein the data post-processing module determines whether the number of data points grouped to a boundary data cluster among the data clusters is smaller than a data point number threshold, wherein when the number of the data points grouped to the boundary data cluster is smaller than the data point number threshold, the data post-processing module combines the boundary data cluster with an adjacent data cluster among the data clusters.

* * * * *